June 19, 1934.  M. HELLER  1,963,167
METHOD OF AND APPARATUS FOR GENERATING WATER GAS FROM PULVERIZED FUEL
Filed March 29, 1929  2 Sheets-Sheet 1
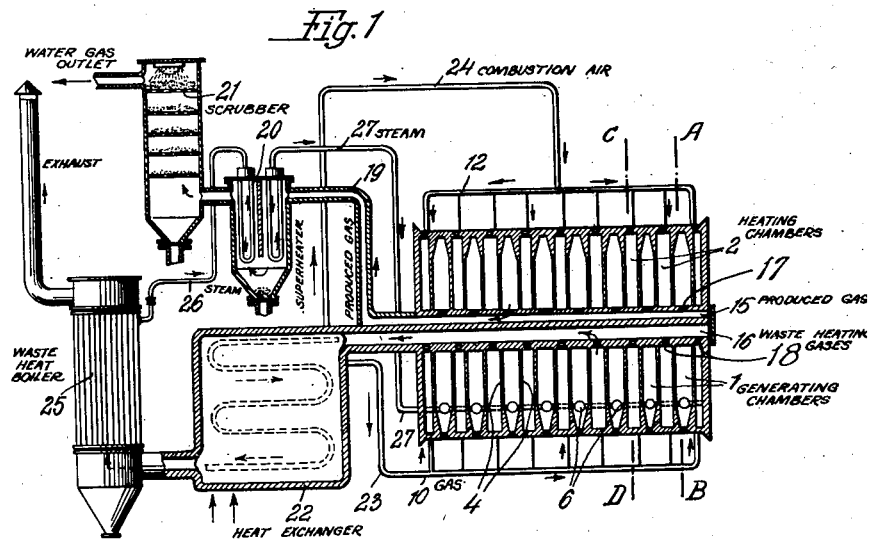
Inventor:
MAX HELLER June 19, 1934. M. HELLER 1,963,167
METHOD OF AND APPARATUS FOR GENERATING WATER GAS FROM PULVERIZED FUEL
Filed March 29, 1929 2 Sheets-Sheet 2
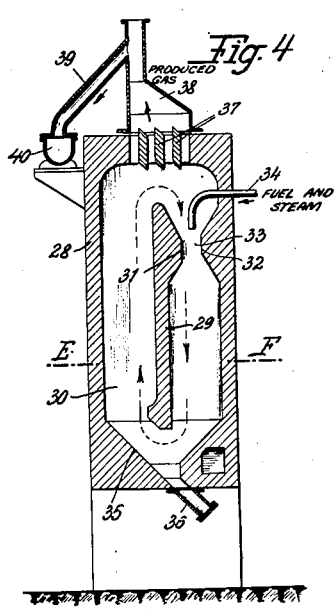
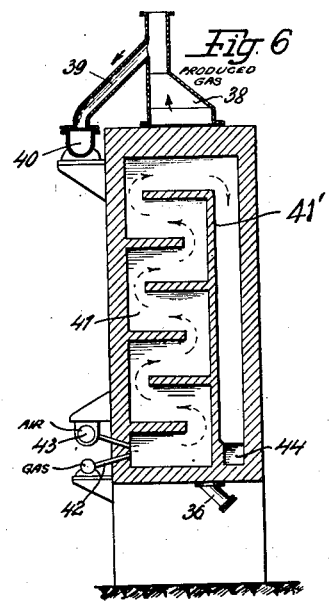
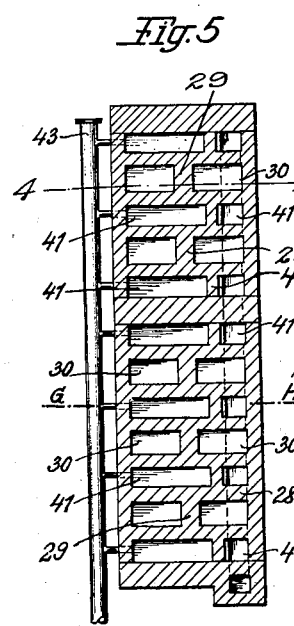
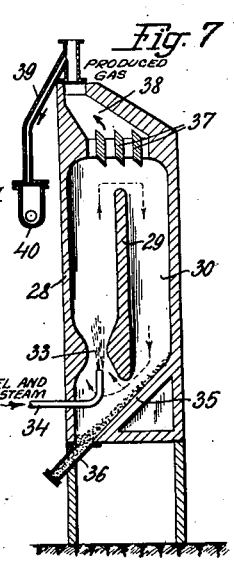
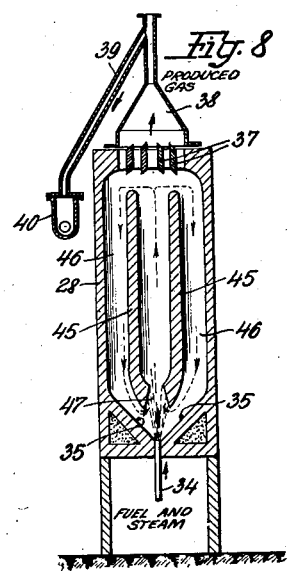
Inventor
MAX HELLER
by
Attorneys Patented June 19, 1934

1,963,167

UNITED STATES PATENT OFFICE 1,963,167

METHOD OF AND APPARATUS FOR GENERATING WATER GAS FROM PULVERIZED FUEL

Max Heller, Charlottenburg, Germany

Application March 29, 1929, Serial No. 350,912
In Germany April 2, 1928

6 Claims. (Cl. 48—108)

My invention relates to a method of, and apparatus for, generating water gas from pulverized fuel. It is an object of my invention to provide more efficient method and apparatus for the purpose specified, and to this end I impart circulating movement to a mixture of fuel and steam while heating the mixture.

In the generation of water gas by causing steam to act on heated fuel heat is consumed and the energy thus lost must be made up for in order to maintain the temperature required for dissociation.

It has already been proposed to eject a mixture of fuel and steam so that it impinges on a heated wall, or that it flows in parallel to the wall but this is inefficient as the fuel is subjected to the action of heat only during the very short time it impinges on the wall, or flows in contact with it. Apart from this limited duration of the heat action, only those particles will be heated to the required temperature which flow in the immediate vicinity of the heated wall so that the percentage of undissociated fuel is high.

It has also been proposed to impart circulating movement to the fuel by blowing into a circular chamber by means of tangential nozzles but in this method air was supplied to burn part of the fuel which part served for making up the heat required.

By imparting circulating movement to the particles while heating them by an outer source of heat as in my invention the particles are repeatedly brought into contact with the heated wall until they have attained the dissociation temperature required in the generation of water gas. Centrifugal action holds the particles to the wall while they still contain fuel and consequently are comparatively heavy, and only releases them after they have been burned to ash and become so light that centrifugal action ceases to influence them. In other words, all particles in the mixture remain in contact with the heated wall until the fuel in them has been consumed so that complete conversion is obtained. In view of this efficient treatment, high velocity may be imparted to the mixture in a comparatively small generator chamber, and the higher the velocity the more complete the heat transfer from the wall, and the more rapid the gas generation.

In a retort having a circular or substantially circular area the discharge pipe for the gas and ash residue is preferably arranged in the axis of the chamber and extends through the end walls of the chamber at a tight fit, having openings connecting it with the interior of the chamber. The ash admixed to the gas is under the combined action of centrifugal force and of the draught in the discharge pipe but as the weight of the ash particles is so small the centrifugal force is overcome.

It is important that the heating of the chamber should be efficient and in order to distribute the heat energy over the walls of the generating chamber I may provide a heating chamber or chambers in which heating gas and air for combustion are also circulating. A whirling flame is thus generated in the heating chamber which immediately breaks up the fresh gas and air and distributes them so that the formation of pointed flames is eliminated. Such flames should be avoided as they cause local heating of the chamber walls. The heating gases may be discharged by a central pipe like the gas and ash from the generator chambers. In this manner a helical flow toward the discharge pipe is obtained from the perimeter toward the discharge pipe. A heating jacket may be provided for preheating the gas and air before they enter the heating chamber or chambers. In this manner not only the efficiency of combustion is increased but heat radiation from the chamber walls is also prevented. If desired the heating jacket may also extend to the generating chambers so that the chambers are heated on all sides.

Preferably I combine a set of generating and heating chambers into a retort, with a central discharge pipe extending through the retort. The discharge pipe has separate passages for removing the gas and the ash, and the heating gases which passages are connected with the interior of the respective chambers by suitable openings.

The chamber or chambers, or the retort, as the case may be, may be horizontal or vertical. In the case of a vertical chamber or retort, I provide a discharge space at the top of the generating chamber or chambers adjacent the flow of mixture in the chamber for removing the gas and the ash particles. Suction is exerted in the space and a certain percentage of the circulating mixture is tapped into the space but without interfering with the circulation to any appreciable extent. If the volume of the space is suitably selected it acts as a settling chamber in which the particles of fuel which still contain combustible matter and therefore are heavier, are separated from the discharge flow and fall back into the circulating mixture.

I may assist the circulation of the mixture by providing in the chamber a sort of choke tube and ejecting the mixture into the choke tube.

In the apparatus that will now be described it has been assumed that the steam and the fuel are introduced together but they may be introduced separately without departing from my invention.

In the accompanying drawings a plant in which my method may be performed is illustrated by way of example.

Figs. 1, 2, and 3 illustrate a plant having a cylindrical horizontal retort,

Figs. 4, 5 and 6 illustrate a vertical retort or shaft, with the aforesaid choke tube at the top, Fig. 7 is a section of a retort as in Figs. 4 to 6, but with the choke tube at the bottom, Fig. 8 is a section of a retort like that in Fig. 7 but with two circulating chambers.

More particularly,

Fig. 1 is a vertical section of the complete plant,

Figs. 2 and 3 are sections on the lines A—B and C—D in Fig. 1, respectively,

Fig. 4 is a vertical section through one of the generating chambers of the retort, said section being taken substantially on line 4—4 of Fig. 5;

Fig. 5 is a section on the line E—F in Fig. 4, and

Fig. 6 is a section on the line G—H in Fig. 5.

Referring now to Fig. 1, 1 are the generating, and 2 are the heating chambers of the retort which is here shown as a cylinder, 4, 4 are the partitions of the chambers, 15 is a gas and ash discharge passage arranged centrally in the chambers but connected only with the generating chambers 1, 19 is a gas discharge pipe connected with the passage 15, and 21 is a scrubber in which the gas from the pipe 19 is separated from the ash particles. 16 is a central passage in parallel to the passage 15 but connected only with the heating chambers 2, 22 is a heat exchanger connected with the passage 16, 24 is a pipe for the combustion air which issues from the exchanger 22, 12 is a header through which the air is admitted to the heating chambers 2, 23 is a gas pipe, also issuing from the exchanger 22, and 10 is a header distributing the gas to the heating chambers 2. 25 is a waste-heat boiler in which steam is generated by the residual heat energy from the exchanger 22, 26 is a steam pipe, 20 is a superheater connected with the steam pipe 26 and heated by the gas from the pipe 19, 27 is a steam pipe connected with the other end of the superheater 20, and 6 are nozzles at the bottom of each generating chamber through which the mixture of steam and fuel is ejected into the chambers, the fuel being admixed to the steam at any suitable point by means not shown.

Referring now to Fig. 2 this shows one of the generator chambers having a peripheral wall 3 and end walls 4, all of refractory material, the end walls being also those of the adjacent heating chambers 2; 6, 6, 6 are three mixture nozzles at the bottom of the chamber 1 and arranged tangentially to its perimeter, 14 is a central pipe in the chamber 1, 15 is the gas passage already referred to which is made in the upper half of the pipe, and 17 are openings in the top of the pipe through which the gas and ash are admitted to the passage 15.

Referring now to Fig. 3, 5 is the peripheral wall of one of the heating chambers 2, 7 is a heating jacket surrounding it, 8 and 9 are the chambers formed by the peripheral wall and the jacket, the space 8 being connected with the gas header 10, and the space 9 with the air header 12, 11 and 13 being ports extending into the chamber 2 from the respective cavities above the header 12, and below the header 10, respectively. The ports are directed tangentially to the perimeter of the chamber 2. 16 is the passage for discharging the heating gases from the chambers 2 which is arranged in the pipe 14 below the gas passage 15 and is provided with tangential ports 18, 18.

If desired the jacket 7 may extend across the peripheral walls 3 of the generating chambers 1.

The mixture of fuel and steam and the gas and air are imparted whirling movement in the respective chambers by the tangential arrangement of the nozzles or ports through which they are admitted. The whirling flames in the heating chambers heat the walls 4 of the generating chambers and the mixture in the latter flows past the walls at high velocity until all its content of combustible matter has been consumed. The particles attain decomposition temperature only after several circulations and are then changed into ash which being lighter is not subjected to centrifugal action to such an extent as the heavier fuel particles so that they are drawn into the passage 15 with the gas. Accumulation of dust at the bottom of the chambers is prevented by the nozzles 6. The water gas discharged through the passage 15 only contains ash but no fuel substance, and the efficiency of the generator is high on account of the high velocity of the flowing media. The whirling flames in the chambers 1 distribute the heat very uniformly over the walls 4, and the fresh gas and air are immediately engaged and entrained by the flames at 11 and 13.

Referring now to Figs. 4, 5, and 6, this retort 28 is built up from narrow, vertical gas generating chambers 30 and heating chambers 41 but, if desired, cylindrical heating chambers like 2 in Figs. 1 to 3 might be provided. The generating chambers 30 are provided with central vertical partitions 29, 31 being a boss on one side of the partition, and 32 being a corresponding boss in the adjacent wall of the chamber. The two bosses make up a sort of choke tube 33 in the downtake at the right of the partition 29, and 34 is a pipe for supplying mixture which extends into the choke tube 33. In this manner a downflow is generated at the right, and an upflow at the left of the partition 29, 35 is an inclined face at the bottom of the chamber 30, and 36 is a discharge pipe at the lower end of the incline. 37 is a grate in the top of the chamber, 38 is the aforementioned settling chamber above the grate, 39 is a discharge pipe at the top of the settling chamber, and 40 is a scrubber at the lower end of the pipe.

Referring now to Fig. 6 this shows one of the heating chambers. 43 is the air pipe, and 42 is the gas pipe both of which open at the bottom of the chamber. The flame rises in an uptake 41 at the left of a vertical partition 41' past horizontal baffles and flows to the flue 44 at the bottom of the retort in a downtake at the right of the partition.

The mixture circulates rapidly in the annular cavity of the generating chamber 30 as indicated by the dotted arrow in Fig. 4, being reversed above and below the partition 29, and, similarly as in the retort Figs. 1 to 3, the particles will circulate until they have been changed to ash. Heavy particles which might leave the flow of the mixture are deposited in a thin layer on the incline 35 where they are entrained by the flow of gas for the major part, or at least heated to the dissociation temperature. Ash is removed at 36.

Suction prevails in the discharge space or settling chamber 38 which may be connected to a chimney or a suction nozzle, not shown, and this suction draws into the settling chamber part of the circulating mixture through the grate 37 and this tapped part gradually loses its high velocity as the volume of the settling chamber 38 is much larger than the free area between the grate bars. The heavier particles which still contain combustible matter separate from the lighter ash in the chamber 38 and are returned to the flow of the mixture so that here as well as in the retort described with reference to Figs. 1 to 3, no unconsumed particles are allowed to escape.

As mentioned, the steam and fuel may be introduced separately and this may be effected in the present instance by using the settling chamber 38 as a charging hopper, the fuel dropping down into the flow of the mixture.

The partition 29 may be dispensed with if the generating chamber is suitably designed.

Referring now to Fig. 7, this gas generating chamber has the choke tube 33 and the nozzle 34 at the bottom just above the incline 35 so that any matter which settles on the incline is effectively returned to the circulation of the mixture.

Referring now to Fig. 8 this shows two parallel partitions 45, 45 in the gas generating chamber each forming a circulating passage 46 with the adjacent wall of the chamber. The lower ends of the partitions are inclined toward each other to form a choke tube 47, 34 is the supply nozzle extending into the choke tube from below, and 35, 35 are inclines at either side of the nozzle 34. In this manner two circulating flows are generated as indicated by the arrows and any dust which deposits on the inclines 35 is lifted by the flow as in the case of Fig. 7.

Instead of steam any other gaseous fluid may be introduced with the fuel, for instance, a permanent gas.

With uncoked or partly coked fuels double gas may be generated, that is, gas consisting of gasified tar, city gas, and water gas.

Any finely subdivided fuel may be used, as pulverized coal, coal breeze, or other fine-grained fuel. It is evident that liquid fuels, for example, hydrocarbon oils, could also be used as the centrifugal action would, as in the case of coal, hold the fuel against the heated walls and thereby insure its complete conversion into gas.

I claim:

1. A plant for generating gas from finely subdivided fuel, comprising a central tubular structure having two separate longitudinal passages, a series of spaced generating chambers surrounding said tubular structure and communicating with one of its passages, and a series of heating chambers located between said generating chambers and likewise surrounding said tubular structure, and communicating with its other passage.

2. A plant according to claim 1, in which separate headers are provided for supplying gas and air respectively to the outer portions of the heating chambers.

3. A plant for generating gas from finely subdivided fuel, comprising a series of spaced gas generating chambers each having a continuous path for the circulation of the material under treatment and provided with means for introducing finely subdivided fuel and a gaseous fluid at one point of said path and withdrawing the resulting gas at another point of said path, and a series of heating chambers located between said generating chambers to heat them externally.

4. A method of generating gas, which consists in introducing finely subdivided fuel and a gasifying medium into a gas producing chamber, and causing said fuel and said medium, under the influence of the gasifying medium which enters in a strong jet through an inlet opening, to whirl or circulate inside the chamber in a vertical plane past the inlet opening whereby said fuel and gasifying medium pass repeatedly in front of said inlet opening, applying heat externally to said generating chamber, and withdrawing the reaction products from said chamber at a point remote from said inlet opening.

5. A process according to claim 4 in which the fuel and medium are introduced at one end of the chamber and the resulting product is withdrawn at the other end of the chamber.

6. A process according to claim 4 in which the fuel and medium are introduced at the lower end of the chamber and the resulting product is withdrawn at a point above the center of the chamber.

MAX HELLER.